(12) United States Patent
Hershtik

(10) Patent No.: US 7,573,567 B2
(45) Date of Patent: Aug. 11, 2009

(54) EGG COUNTER FOR COUNTING EGGS WHICH ARE CONVEYED ON AN EGG COLLECTION CONVEYER

(75) Inventor: Johanan Hershtik, Netanya (IL)

(73) Assignee: Agro System Co., Ltd., Gifu (JP)

( * ) Notice: Subject to any disclaimer, the term of this patent is extended or adjusted under 35 U.S.C. 154(b) by 405 days.

(21) Appl. No.: 10/562,683

(22) PCT Filed: Aug. 31, 2005

(86) PCT No.: PCT/JP2005/016351
§ 371 (c)(1), (2), (4) Date: Dec. 28, 2005

(87) PCT Pub. No.: WO2007/029316
PCT Pub. Date: Mar. 15, 2007

(65) Prior Publication Data
US 2008/0151220 A1   Jun. 26, 2008

(51) Int. Cl.
*A01K 43/00* (2006.01)
*G01N 33/08* (2006.01)
*G01N 21/55* (2006.01)
*A01K 43/04* (2006.01)
*G06M 7/00* (2006.01)
*G06M 9/00* (2006.01)
*G06M 11/00* (2006.01)

(52) U.S. Cl. ............... 356/54; 356/445; 377/6; 209/511

(58) Field of Classification Search .............. None
See application file for complete search history.

(56) References Cited

U.S. PATENT DOCUMENTS

| | | | | |
|---|---|---|---|---|
| 3,971,918 A | * | 7/1976 | Saito | 377/8 |
| 4,205,752 A | * | 6/1980 | Malvick et al. | 209/564 |
| 4,693,607 A | * | 9/1987 | Conway | 356/627 |
| 4,868,901 A | * | 9/1989 | Kniskern et al. | 250/222.2 |
| 5,313,508 A | * | 5/1994 | Ditman et al. | 377/6 |
| 5,960,098 A | * | 9/1999 | Tao | 382/110 |
| 6,097,493 A | * | 8/2000 | Satake et al. | 356/609 |
| 6,369,892 B2 | * | 4/2002 | Richert | 356/402 |
| 2007/0278284 A1 | * | 12/2007 | Kalkhoff | 235/98 C |

FOREIGN PATENT DOCUMENTS

JP    2003346124 A   * 12/2003

* cited by examiner

*Primary Examiner*—Gregory J Toatley, Jr.
*Assistant Examiner*—Gordon J Stock, Jr.
(74) *Attorney, Agent, or Firm*—Stites & Harbison PLLC; Ross F. Hunt, Jr.; Jeffrey A. Haeberlin

(57) ABSTRACT

An egg counter for counting eggs conveyed on an egg collection conveyor, includes first and second light emitting element arrays, a light receiving element array between the first and second light emitting element arrays, and a controller for processing light reflected from the respective eggs and received by the light receiving element array. The arrangement is such that light emitted from the light emitting elements of the arrays is reflected from the surface of the egg passing just under the light receiving element array, and received by the light receiving element array. The controller measures the light intensity of the reflected light, detects the peak value of the light intensity, and counts the egg on the basis of the two peak values of the light intensity with respect to that of the light emitted by the light emitting element arrays.

7 Claims, 9 Drawing Sheets (a)

(b)

EGG COUNTER FOR COUNTING EGGS WHICH ARE CONVEYED ON AN EGG COLLECTION CONVEYER

TECHNICAL FIELD OF THE INVENTION

This invention relates to an improvement of an egg counter for counting eggs which are conveyed on an egg collection conveyer.

BACKGROUND ART

There is known an egg counter for counting eggs which are conveyed on an egg collection conveyer to collect eggs laid by the poultry in a poultry house.

As shown FIG. 9, a conventional egg counter 30 comprises one infrared light emitting element array 31 and one infrared light receiving element array 32. The egg counter 30 is disposed above an egg collection conveyer 33.

Each of the infrared light emitting elements of said array 31 emits an infrared light R toward a predetermined area on the egg collection conveyer 33 where is substantially opposite to the infrared light receiving element array 32. When an egg E is passed through the predetermined area, the infrared light R emitted from the infrared light emitting element reflects on a surface of the egg E. Then the reflected infrared light R is received by the corresponding infrared light receiving element of said array 32, and a light intensity thereof is determined by a control means not shown in drawing. The control means is intended to detect a peak value of the light intensity of the infrared lights reflected on the egg E. The egg E is counted if the peak value is detected.

DISCLOSURE OF THE INVENTION

Problems to be Solved by the Invention

However, since the above-mentioned conventional egg counter has only one infrared light emitting element array 31 with respect to one infrared light receiving element array 32, the following problems are caused.

The eggs E don't line up regularly at equal intervals on the egg collection conveyer 33. The eggs might be crowded on the egg collection conveyer 33. As shown in FIG. 10(a), if the eggs are crowded on the egg collection conveyer 33, adjacent eggs E1 and E2 can create a reflection so it might be interpreted as a peak value of light intensity of the reflected infrared lights. In this case, an extra egg will be miscounted.

As shown in FIG. 10(b), if the egg collection conveyer 33 consists of an endless belt, the infrared light R emitted from the infrared light emitting element might reflect twice on both surfaces of the belt and egg E, and then the reflected infrared light might be received by the infrared light receiving element. If said twice reflected infrared light is interpreted as a correct peak value of light intensity of the reflected infrared light by the control means, an extra egg will be miscounted.

Means for Solving the Problems

In order to solve the above problem, an egg counter for counting eggs which are conveyed on an egg collection conveyer according to the present invention comprises a first light emitting element array, a second light emitting element array, a light receiving element array that is provided between said first and second light emitting element arrays, and a control means for processing the light reflected on the respective eggs and received by the light receiving element array, said first and second light emitting element arrays and said light receiving element array being arranged such that the light emitted from the each of the light emitting elements in the arrays is reflected on the surface of the egg that is passing just under the light receiving element array, and then the reflected light is received by the light receiving element array, said the control means being intended to measure the light intensity of the reflected infrared light, detect the peak value of the light intensity, and count the egg on the basis of the two peak values of the light intensities with respect to first and second infrared light emitting element arrays.

Advantages of the Invention

As described above, an egg counter for counting eggs which are conveyed on an egg collection conveyer according to the present invention comprises first and second light emitting element arrays. In the egg counter of the present invention, a control means counts the egg on the basis of the two peak values of the light intensities with respect to first and second light emitting element arrays.

If one light emitted from the one light emitting element array incorrectly reflects and then the light receiving means receives incorrect reflected light, other reflected light emitted from the other light emitting element array can not be received the light receiving element array. Therefore, even if the incorrect reflected light with respect to the one light emitting element array is interpreted as a peak value of the light intensity by the control means, an extra egg will not be miscounted on the basis of the data with respect to the other light emitting element array.

THE BEST MODE FOR CARRYING OUT THE INVENTION

An embodiment of an egg counter for counting eggs which are conveyed on an egg collection conveyer according to the present invention will now be described with reference to the embodiment shown in attached drawings.

Figure 1:
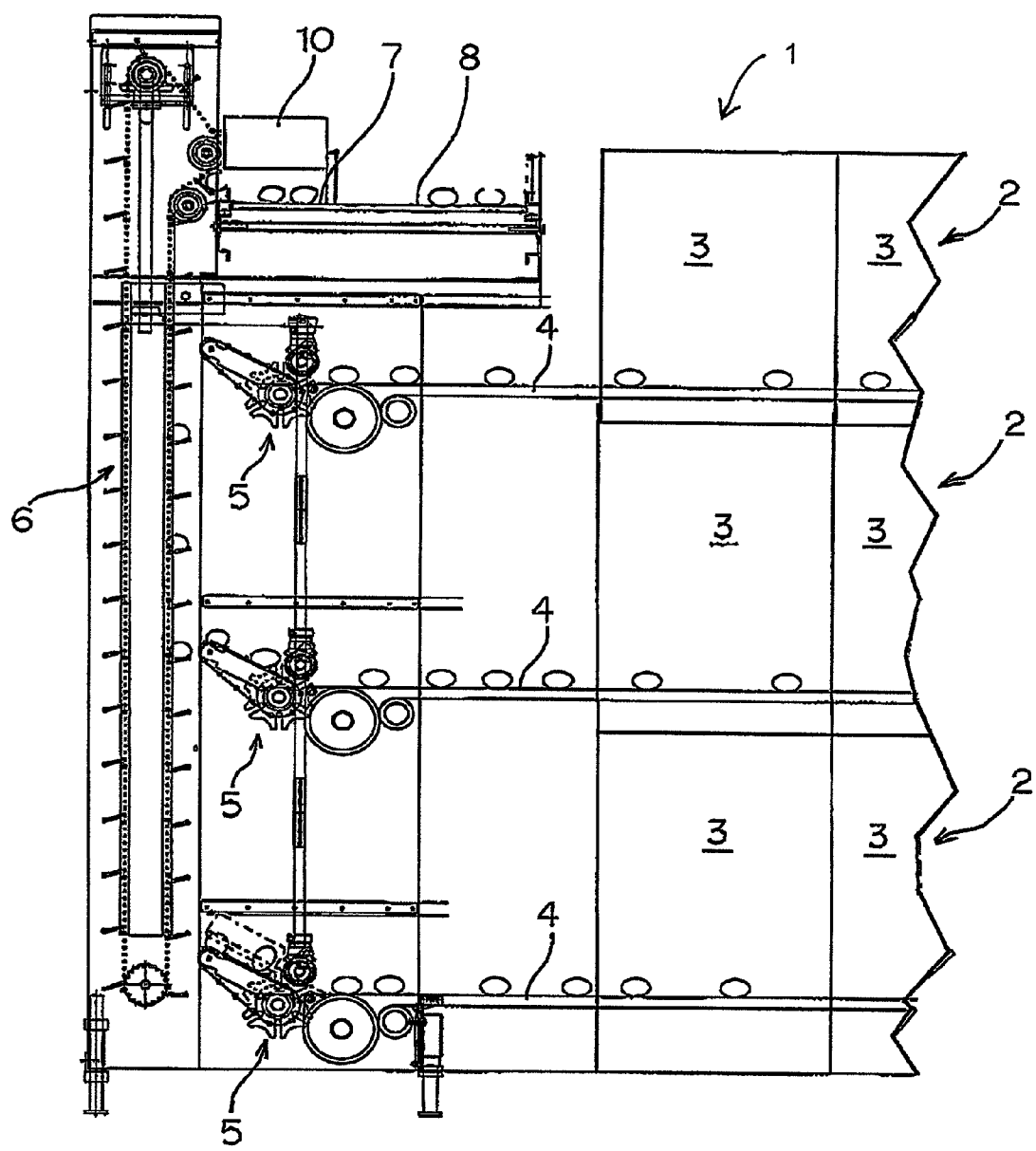
FIG. 1 is a schematic side view of a cage unit in a poultry house, which is provided with the egg counter according to the present invention.

FIG. 1 is a schematic side view of a cage unit in a poultry house, in which the egg counter according to present invention is provided.

In the poultry house, a number of the cage units 1 are provided. Each of the cage units 1 comprises three cage chamber arrays 2 that are piled each other. Each cage chamber array 2 is divided into a number of cage chambers 3.

Each of cage chamber arrays 2 comprises a first egg collection conveyer 4 that extends along the longitudinal direction of the cage chamber array 2. The first egg collection conveyer 4 receives the egg from each of the cage chambers 2 and transmits the received eggs toward a one end thereof.

At the end of the each first egg collection conveyer 4 (the left end of the conveyer 4 in FIG. 1), an egg transferring means 5 is provided. Each of the egg transferring means 5 receives the egg from the corresponding first egg collection conveyer 4 and passes the egg to an egg elevating means 6. The egg elevating means 6 receives the eggs from each of the egg transferring means 5 and elevates the egg to a second egg collection conveyer 7.

The second egg collection conveyer 7 is disposed on an upper portion of the cage unit. The egg counter 10 is disposed above the second egg collection conveyer 7.

In FIG. 1, a numeral number 8 indicates a third egg collection conveyer for conveying eggs collected in the other cage units.

Figure 2:
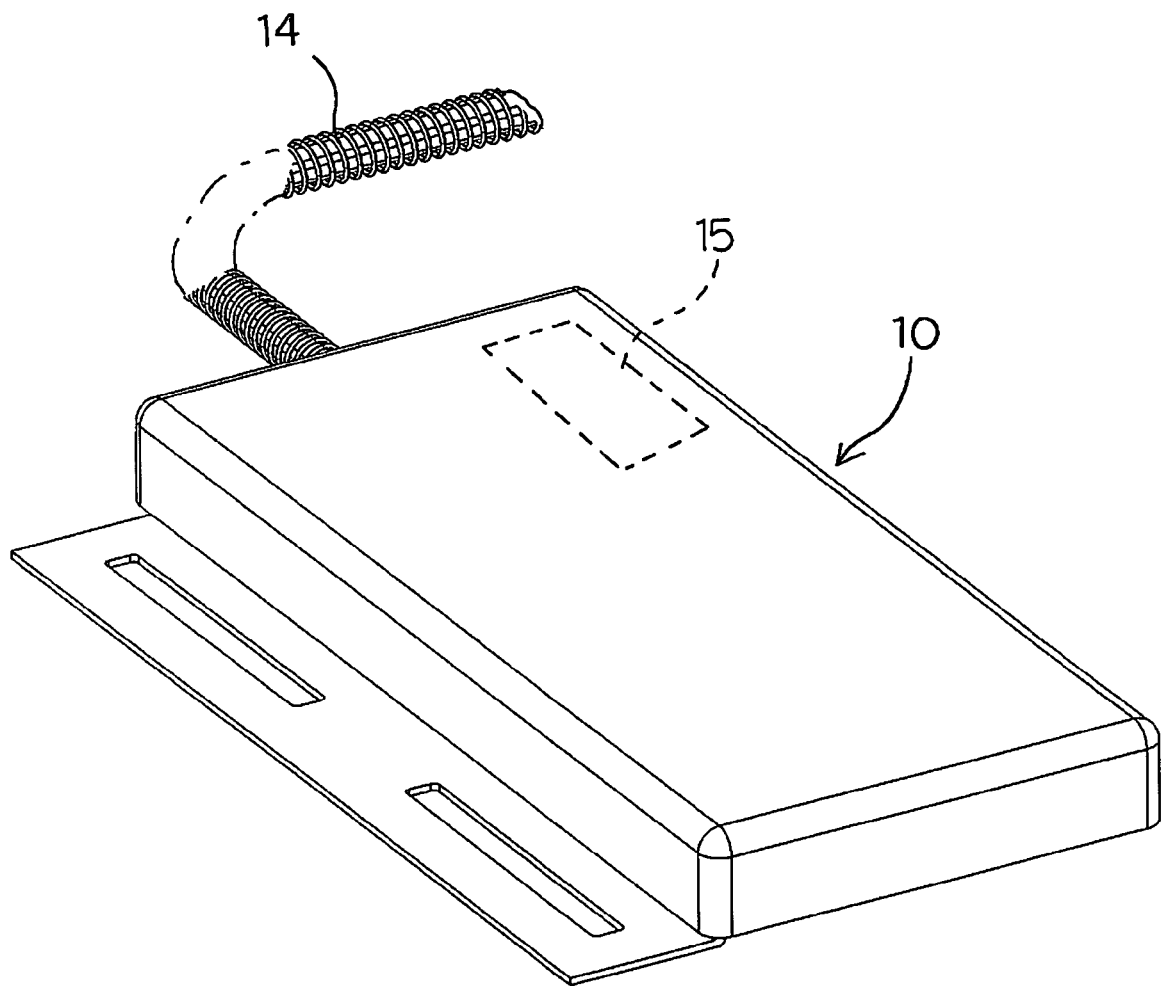
FIG. 2 is a perspective view of the egg counter according to present invention seen from the upper side thereof.
Figure 3:
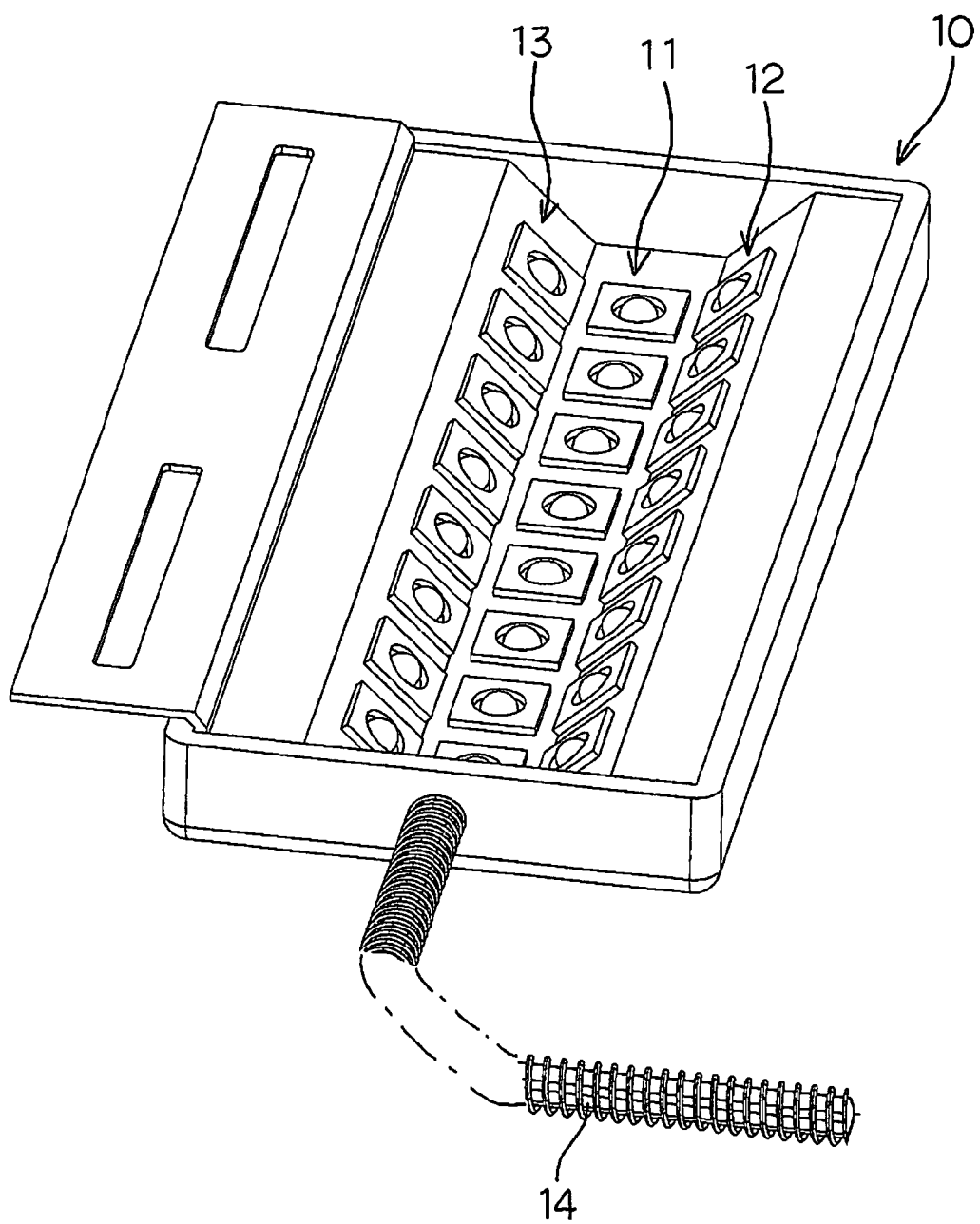
FIG. 3 is a perspective view of the egg counter according to present invention seen from the bottom side thereof.

As shown in FIGS. 2 and 3, the egg counter 10 has one infrared light receiving element array 11 and two infrared light emitting element arrays 12 and 13. The infrared light receiving element array 11 includes eight infrared light receiving elements. The first infrared light emitting element array 12 includes eight infrared light emitting elements and the second infrared light emitting element array 13 also includes eight infrared light emitting elements.

Each of the infrared light receiving elements, for example, comprises a photodiode. Each of the infrared light emitting elements, for example, comprises a light emitting diode.

The infrared light emitting element arrays 12 and 13 are arranged on both sides of the infrared light receiving element array 11 in symmetry.

In FIG. 2, a numeral number 15 indicates a controller provided in the egg counter 10, and a numeral number 14 indicates data output cable that transmits data with respect to the number of eggs counted by the egg counter 10.

The egg counter 10 is disposed above the second egg collection conveyer 7, so that the eggs E pass under the egg counter 10. The infrared light emitting element arrays 12 and 13 are alternately and sequentially turned on, therefore, the infrared light emitting element arrays 12 and 13 alternately and sequentially emit the infrared light toward the predetermined area on the conveyer 7 that is substantially corresponding to the position under the infrared light receiving element array 11.

Figure 4:
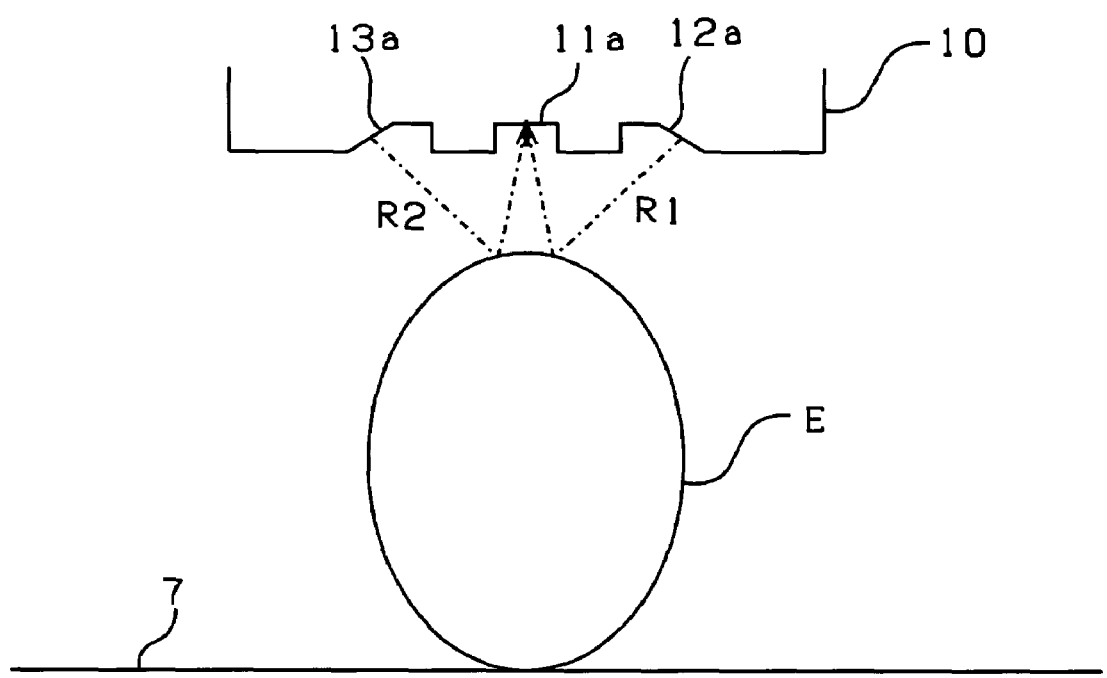
FIG. 4 is a schematic cross section view of the egg counter and an egg collection conveyer.

As shown in FIG. 4, when the egg E is passing under the infrared light receiving element array 11a, the infrared light R emitted from each of the infrared light emitting elements of said arrays 12a and 13a reflects on a surface of the egg E and then the reflected infrared light R1 and R2 is received by the corresponding infrared light receiving element of said array 11a. The reflected infrared light received by each of the infrared light receiving elements is transmitted to the controller 15. The controller 15 is operated to measure the light intensity of the reflected infrared light and detect a peak value of the light intensity on the basis of the measured light intensities.

Since the infrared light emitting element arrays 12a and 13a are alternately and sequentially turned on, when the egg E is passing just under the infrared light receiving element array 11a, the infrared lights R1 emitted from the infrared light emitting element array 12a and the infrared light R2 emitted from the infrared light emitting element array 13a are continuously reflected on the surface of the same egg E, and then are continuously received by the infrared light receiving element array 11a. Therefore, if the controller 15 continuously detects two peak values of the light intensity, the egg E is counted. Oppositely, even if one peak value of the light intensity is detected by the controller 15, when two consecutive peak values cannot be detected, the egg is not counted.

Figure 5:
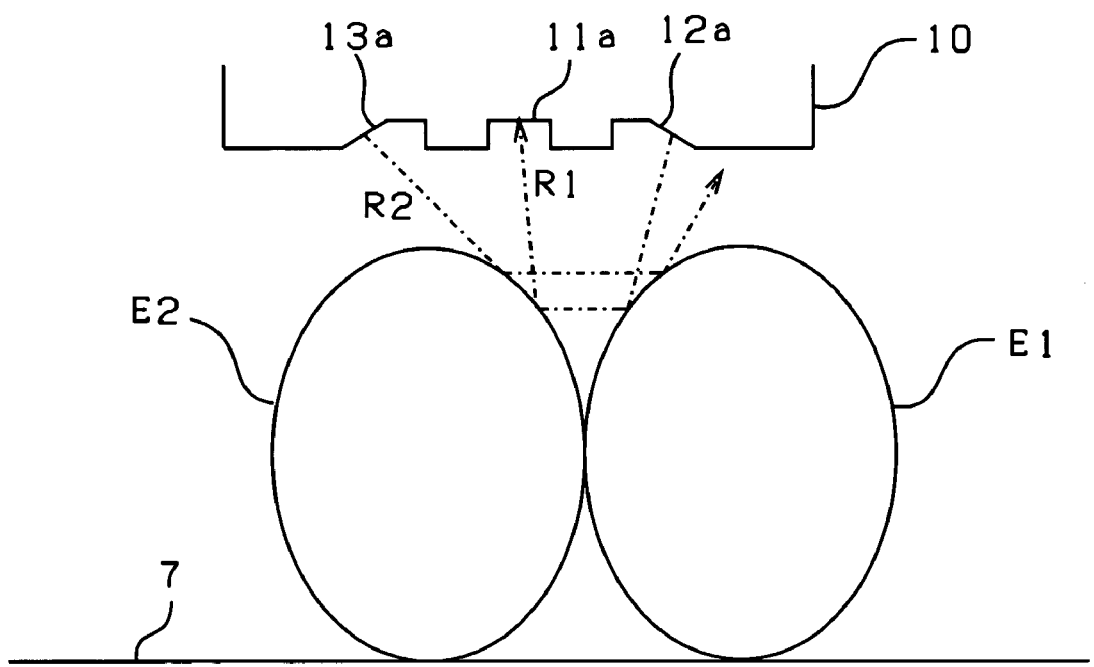
FIG. 5 is a schematic cross section view of the egg counter and an egg collection conveyer in order to illustrate the state that the eggs are crowded on the egg collection conveyer.

FIG. 5 illustrates the state that the eggs E are crowded on the egg collection conveyer 7.

As shown in FIG. 5, when the eggs are crowded on the egg collection conveyer 7, the infrared light R1 emitted form the infrared light emitting element 12a might reflect twice on the surfaces of the two eggs E1 and E2, and then the infrared light receiving element 11a might receive the twice reflected infrared light R1. However, in this case, the reflected infrared light R2 emitted from the infrared light emitting element 13a can not received by the infrared light receiving element 11a. Therefore, if the twice reflected infrared light R1 is interpreted as a peak value of the light intensity by the controller, the controller can not detect two consecutive peak values, so that an extra egg will not be miscounted.

Figure 6:
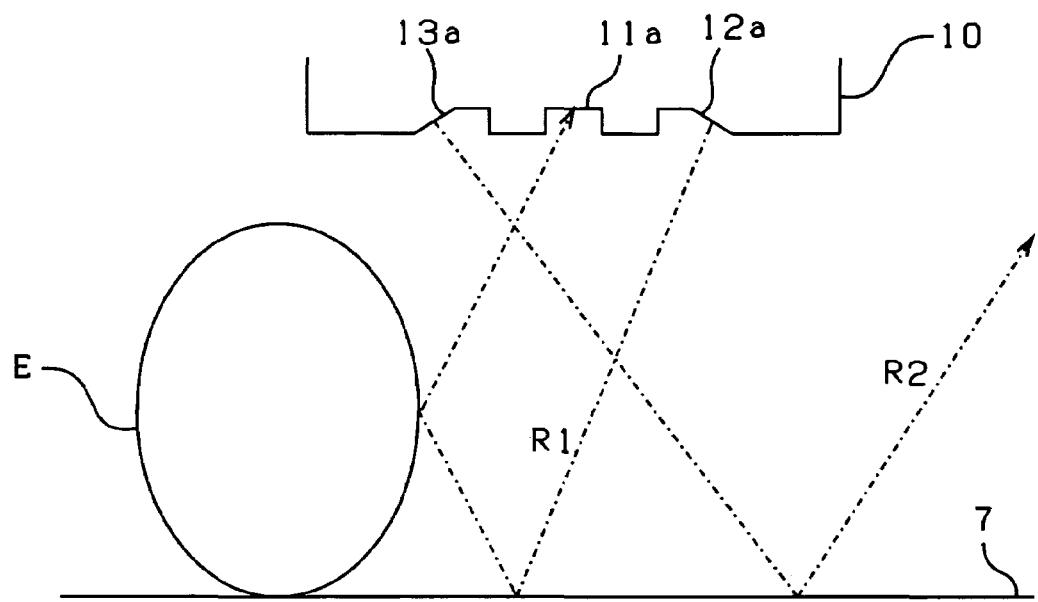
FIG. 6 is a schematic cross section view of the egg counter and an egg collection conveyer in order to illustrate the state that the infrared light reflects on the both surfaces of the conveyer and the egg.

As shown in FIG. 6, if the infrared light R1 emitted form the infrared light emitting element 12a reflects twice on the both surfaces of the conveyer 7 and the egg E, and then the twice reflected light is received by the infrared light receiving element 11a, the reflected infrared light R2 emitted form the infrared light emitting element 13a can not received by the infrared light receiving element 11a. Therefore, if the twice reflected infrared light R1 is interpreted as a peak value of the light intensity by the controller, the controller can not detect two consecutive peak values, so that an extra egg will not be miscounted.

In the embodiment mentioned above, the infrared light emitting element arrays 12a and 13a are arranged to alternately and sequentially emit the infrared light. It is, however, appreciated that the irradiation timing is not restricted to the illustrated embodiment. For example, if it is assumed that the period during which firstly the first infrared light emitting element array 12a is turn on while the second infrared light emitting element array 13a is turned off, then the first infrared light emitting element array 12A is turned off while the second infrared light emitting element array 13a is turned off, and the first and second infrared light emitting element arrays 12a and 13a are turned off is one cycle of the operation, it is possible to repeatedly operate the infrared light emitting element arrays 12a and 13a at 100 operation cycles per second in the area of AC power supply system having a frequency of 50 Hz and at 120 operation cycles per second in the area of AC power supply system having a frequency of 60 Hz, respectively. By matching the operation of the infrared light emitting section with the frequency of AC power supply in such a manner, even if there is disposed fluorescent lighting system near the egg counter, the any influence of the fluorescent lighting on the operation of the egg counter can be effectively suppressed.

Since the running speed of the egg collection conveyer is at the most about 10 m per minute, by repeatedly performing the light emitting of the infrared light emitting sections at the times mentioned above, egg to be counted can be detected at many times per minute by means of the infrared lights from the two infrared light emitting sections. Therefore, it is possible to exactly count eggs that are not uniform in size, shape and position on the egg collection conveyer.

In the above embodiment, the egg counter is provided above the second egg collection conveyer 7, the position of the egg counter is not restricted to the above embodiment. For example, the egg counter may be disposed above the first egg collection conveyer 4. Also the egg counter may be arranged to count all eggs of the all cage unit provided in the poultry house. In this case, for example, the egg counter may be arranged to extend over the second egg collection conveyer 7 and the third egg collection conveyer 8.

In the above embodiment, the infrared light receiving element array 11a and infrared light emitting element arrays 12a and 13a comprise eight elements respectively, the number of the elements consisting of the each array is not restricted to the above embodiment.

The egg counter according to the present invention is suitable for the belt conveyer and the rod conveyer.

Figure 7:
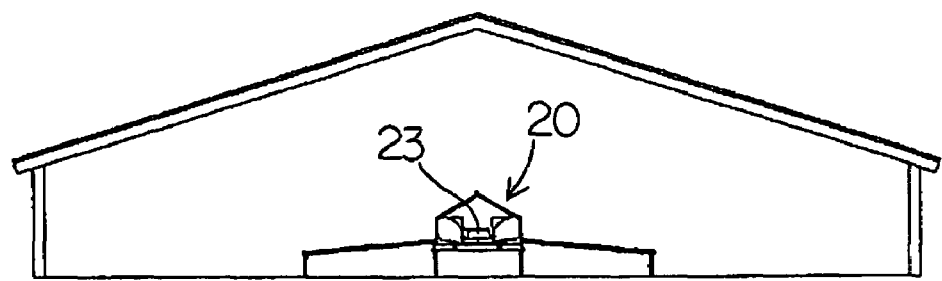
FIG. 7 is a schematic cross section view of a poultry house in which a nest system is arranged.
Figure 8:
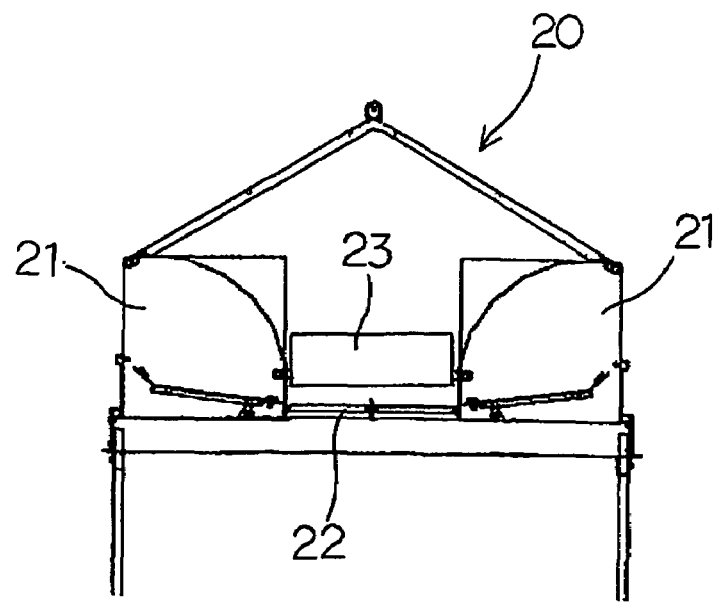
FIG. 8 is a schematic enlarged view of the nest system shown in FIG. 7.
Figure 9:
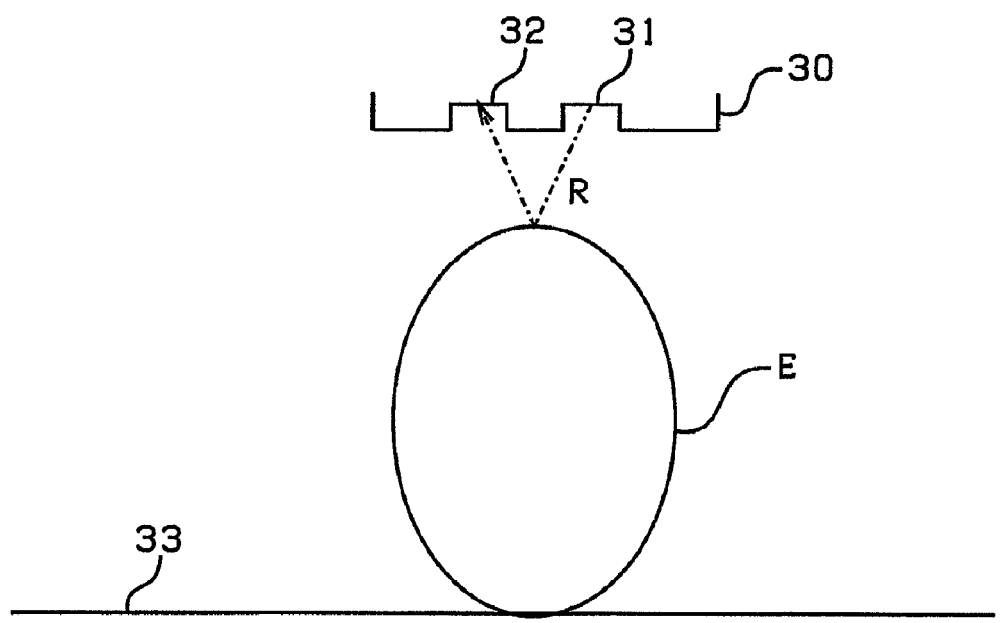
FIG. 9 is a schematic cross section view of a conventional egg counter and an egg collection conveyer.
Figure 10:
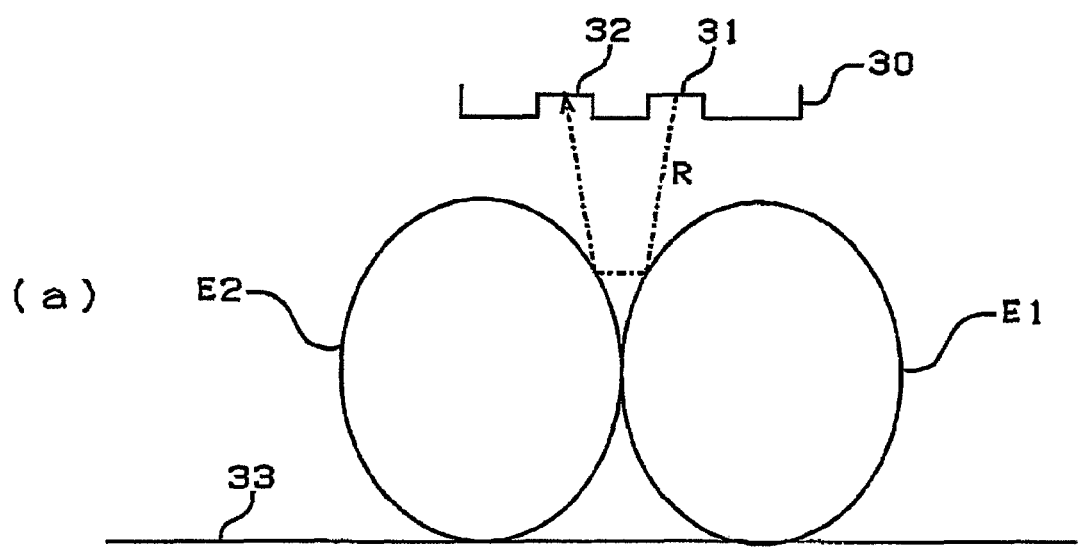
FIG. 10(a) is a schematic cross section view of the conventional egg counter and an egg collection conveyer in order to illustrate the state that the eggs are crowded on the egg collection conveyer.
FIG. 10(b) is a schematic cross section view of the conventional egg counter and an egg collection conveyer in order to illustrate the state that the infrared light reflects on the both surfaces of the conveyer and the egg.
Figure 10:
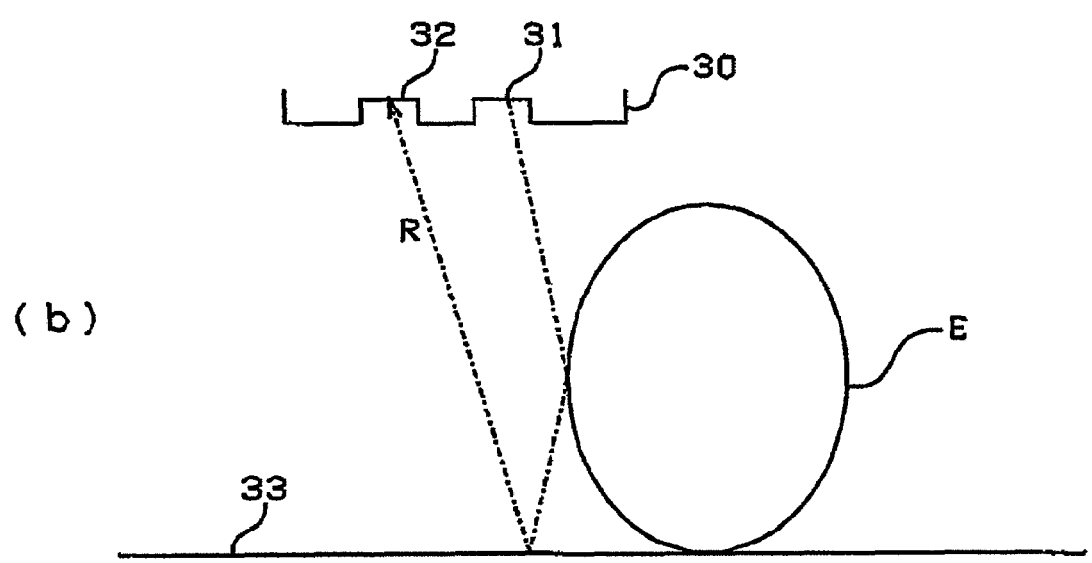

In the above embodiment, the egg counter is provided above the egg collection conveyer that is arranged in the cage unit in the poultry house, however, the kind of the poultry house to be provided with the egg counter according to the present invention. As shown in FIGS. 7 and 8, for example, an egg counter may be arranged above an egg collection conveyer that is arranged in a nest system.

FIG. 7 is a schematic cross section view of a poultry house in which a nest system is arranged and FIG. 8 is a schematic enlarged view of the nest system shown in FIG. 7.

In the FIGS. 7 and 8, a numeral number 20 indicates a nest system, a numeral number 21 indicates a nest, and a numeral number 22 indicates an egg collection conveyer. The eggs laid in the nest by the poultries are collected on the egg collection conveyer 22. An egg counter 23 is provided above the egg collection conveyer 22.

1 cage unit
2 cage chamber array
3 cage chamber
4 first egg collection conveyer
5 egg handing over means
6 egg elevating means
7 second egg collection conveyer
8 third egg collection conveyer
10 egg counter
11 infrared light receiving array
12 first infrared light emitting array
13 second infrared light emitting array
14 data cable
15 control means
20 nest system
21 nest
22 egg collection conveyer
23 egg counter
E egg
R infrared light
30 conventional egg counter
31 infrared light emitting element array
32 infrared light receiving element array
33 egg collection conveyer

The invention claimed is:

1. An egg counter for counting eggs which are conveyed on an egg collection conveyer comprising
    a first light emitting element array,
    a second light emitting element array,
    a light receiving element array provided between said first and second light emitting element arrays, and
    a controller for processing the light reflected from the respective eggs and received by the light receiving element array,
    said first and second light emitting element arrays and said light receiving element array being arranged such that the light emitted from the each of the light emitting elements of the first and second light emitting element arrays is reflected from the surface of the egg that is passing just under the light receiving element array, and the reflected light is then received by the light receiving element array,
    said controller measuring the light intensity of the reflected light, detecting the peak value of the light intensity, and counting the egg passing just under the light receiving element array on the basis of the two peak values of the light intensity with respect to the intensities of the light emitted by the first and second light emitting element arrays.

2. The egg counter according to claim 1, wherein each of said first and second light emitting element arrays comprises a plurality of light emitting elements, respectively.

3. The egg counter according to claim 2, wherein each of said light emitting elements comprises an infrared light emitter.

4. The egg counter according to claim 1, wherein said first and second light emitting arrays and said light receiving element array are arranged to extend across a width of the egg collection conveyer.

5. The egg counter according to claim 1, wherein said first and second light emitting element arrays alternately and sequentially emits the light.

6. The egg counter according to claim 5, wherein said controller counts the egg when two peak values with respect to the reflected light emitted from the first and second light emitting element arrays are continuously detected.

7. The egg counter according to claim 1, wherein
    said light receiving element array is vertically positioned to face the surface of the egg collection conveyer that is passing just under the light receiving element array,
    the first light emitting element array is inclined with respect to the surface of the egg collection conveyer so that the first light emitting element is directed toward an area through which the egg is passing under the light receiving element array, and
    the second light emitting element array is inclined with respect to the surface of the egg collection conveyer so that the second light emitting element is directed toward said area through which the egg is passing under the light receiving element array.

* * * * *

UNITED STATES PATENT AND TRADEMARK OFFICE
CERTIFICATE OF CORRECTION

PATENT NO.       : 7,573,567 B2                                   Page 1 of 1
APPLICATION NO.  : 10/562683
DATED            : August 11, 2009
INVENTOR(S)      : Johanan Hershtik It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Seventh Day of September, 2010

David J. Kappos
*Director of the United States Patent and Trademark Office*